(12) United States Patent
Pedersen (10) Patent No.: US 7,731,210 B2
(45) Date of Patent: Jun. 8, 2010

(54) VEHICLE WITH A TILTABLE CHASSIS

(76) Inventor: Roald H. Pedersen, Kopperudbakken 7, N-2818 Gjovik (NO)

( * ) Notice: Subject to any disclaimer, the term of this patent is extended or adjusted under 35 U.S.C. 154(b) by 907 days.

(21) Appl. No.: 10/539,230

(22) PCT Filed: Dec. 20, 2002

(86) PCT No.: PCT/IB02/05833

§ 371 (c)(1),
(2), (4) Date: Dec. 14, 2005

(87) PCT Pub. No.: WO2004/056645

PCT Pub. Date: Jul. 8, 2004

(65) Prior Publication Data

US 2006/0170171 A1    Aug. 3, 2006

(51) Int. Cl.
*B62K 25/24* (2006.01)
*B62K 5/04* (2006.01)
(52) U.S. Cl. .............. 280/124.103; 180/209; 280/93.51
(58) Field of Classification Search .......... 280/124.103, 280/93.51, 5.509, 5.52, 6.15, 755, 62; 180/209, 180/210
See application file for complete search history.

(56) References Cited

U.S. PATENT DOCUMENTS

| | | | | |
|---|---|---|---|---|
| 4,003,443 A | * | 1/1977 | Boughers | 180/217 |
| 4,020,914 A | * | 5/1977 | Trautwein | 180/210 |
| 4,079,807 A | * | 3/1978 | Hornagold et al. | 180/414 |
| 4,088,199 A | * | 5/1978 | Trautwein | 180/209 |
| 4,351,410 A | * | 9/1982 | Townsend | 180/210 |
| 4,375,293 A | * | 3/1983 | Solbes | 280/22.1 |
| 4,546,997 A | * | 10/1985 | Smyers | 280/5.509 |
| 4,624,469 A | * | 11/1986 | Bourne, Jr. | 280/62 |
| 4,632,413 A | * | 12/1986 | Fujita et al. | 280/124.103 |
| 4,717,164 A | * | 1/1988 | Levavi | 280/259 |
| 4,740,004 A | * | 4/1988 | McMullen | 280/269 |
| 4,887,829 A | * | 12/1989 | Prince | 280/282 |
| 4,974,863 A | * | 12/1990 | Patin | 280/62 |
| 5,580,089 A | * | 12/1996 | Kolka | 280/124.103 |
| 5,611,555 A | * | 3/1997 | Vidal | 280/282 |
| 6,367,824 B1 | * | 4/2002 | Hayashi | 280/62 |
| 6,817,617 B2 | * | 11/2004 | Hayashi | 280/5.509 |

FOREIGN PATENT DOCUMENTS

| | | | |
|---|---|---|---|
| EP | 1155950 | * | 11/2001 |
| FR | 2616617 | * | 12/1988 |
| WO | WO 02/44008 | * | 6/2002 |

* cited by examiner

*Primary Examiner*—Paul N. Dickson
*Assistant Examiner*—George D. Spisich
(74) *Attorney, Agent, or Firm*—Hartman & Hartman, P.C.; Gary M. Hartman; Domenica N. S. Hartman (57) ABSTRACT

A vehicle having a chassis, front wheels each having an axis of rotation, and a suspension assembly for connecting the front wheels to the chassis. The suspension assembly is adapted to allow the front wheels to move transverse to their axes of rotation, but in opposite directions, in order to tilt the chassis. The suspension assembly includes a wheel orientation defining rod coupled to at least one of the front wheels, and a unit for pivotably coupling the wheel orientation defining rod to the chassis. The coupling unit ensures that a wheel orientation of the front wheel defined by the wheel orientation defining rod is essentially independent of movement of the front wheel transverse to the axis of rotation thereof.

48 Claims, 6 Drawing Sheets

VEHICLE WITH A TILTABLE CHASSIS

CROSS REFERENCE TO RELATED APPLICATIONS

This application claims the benefit of International Application No. PCT/IB2002/005833, filed Dec. 20, 2002.

BACKGROUND OF THE INVENTION

The present invention relates to a vehicle comprising a chassis, a pair of front wheels and a suspension assembly for connecting said front wheels to said chassis, said suspension assembly being adapted to allow said front wheels to move transverse to their axis of rotation, but in opposite directions, in order to tilt said chassis.

In other words, the present invention relates to a tiltable vehicle. Tiltable vehicles are already known, e.g. from U.S. Pat. Nos. 3,572,456; 4,003,443; 5,040,812; 4,877,829; EP-B-0 606 191 and WO 98/43872. These known tiltable vehicles, however, comprise only a single front wheel and a pair of rear wheels.

In the case of an accident, vehicles having a pair of front wheels are advantageous as compared to those with only a single front wheel, because the forces occurring in the case of an accident can be absorbed by two instead of a single front wheel.

A tiltable vehicle with a pair of front wheels is known from U.S. Pat. No. 6,149,226. A further prior art reference is U.S. Pat. No. 2,521,986.

A problem with a tiltable vehicle having a pair of front wheels is the so-called "bump steer". In other words, what might happen is that the orientation of a front wheel might be affected by the tilting movement, resulting in undesired steering movements. This is particularly true with view to the fact that large vertical wheel movements occur resulting from the tilting.

BRIEF SUMMARY OF THE INVENTION

It is an object of the invention to provide a vehicle with enhanced stability.

According to the invention, what is provided is that the suspension assembly for connecting the front wheels to the chassis comprises a wheel orientation defining rod being, on the one hand, coupled to a front wheel and, on the other hand, pivotably coupled to said chassis, wherein a coupling of said wheel orientation defining rod to said chassis is positioned to ensure that a wheel orientation defined by said wheel orientation defining rod is essentially independent of said wheel movement transverse to the wheel's axis of rotation.

In other words, according to the invention, the coupling of the wheel orientation defining rod is positioned in a "neutral area", resulting in that the coupling of said rod to the front wheel is always in essentially the same distance from the coupling of said rod to the chassis along the moving path of the wheel during tilting as well as wheel movements induced by an uneven surface.

The above expression "essentially independent" means independent as far as possible with view to usual tolerances and imperfections.

Furthermore, "essentially independent" allows for— which is frequently done in wheel suspensions—a nominal position of the pivot point slightly away from the neutral in order to achieve a certain effect such as always steering slightly in out when all geometrical tolerances are coming into effect.

While said wheel rotation defining rod may be a track rod, what is preferred is that said rod is a steering rod. In other words, preferably, the front wheels are steerable.

The present invention essentially deals with the "straight ahead" steering position in case that the front wheels are steerable. When the suspension is steered in other angles than this position, the pivot points to the chassis move out of the "neutral area" and bump steer might occur. It is however known that especially tiltable vehicles are normally steered with very small road wheel steering angle input together with "weight-shifting" of the vehicles when at speeds higher than 5 to 10 kilometres per hour. Thus, according to the invention, for all driving situations relevant to the tilting, bump steer will not occur.

According to a preferred embodiment, said suspension assembly comprises a first pendulum arm for coupling a front wheel to said chassis. This is a very simple solution for attaching a front wheel to a chassis.

What is furthermore preferred is that said coupling of said wheel orientation defining rod to said chassis is positioned approximately on a tilting pivot axis through a joint for coupling said first pendulum arm to said chassis. Thereby, said coupling of said wheel orientation defining rod to said chassis is positioned in the above-mentioned "neutral area". What is meant by "approximately" is that the position once more might vary with view to usual tolerances and imperfections. Furthermore, the exact optimum position depends on various circumstances and on the overall geometry of the wheel suspension. To this end, reference is made to Jörnsen Reimpell, "Fahrwerkstechnik 3", 8.7, Vogel-Verlag, 1974.

While the above solution particularly refers to embodiments having a single pendulum arm for each front wheel, according to another preferred embodiment of the invention, what is provided is that said suspension assembly comprises a second pendulum arm and said coupling of said wheel orientation defining rod to said chassis is positioned approximately on an axis defined through employing the poles in the suspension mechanism rectangle or trapezoid.

Once more, "approximately" means that the exact optimum position depends on the circumstances and on the geometry. To this end, once more, reference is made to Jörnsen Reimpell, "Fahrwerkstechnik 3", 8.7, Vogel-Verlag, 1974.

Preferably, a cardan joint is used for coupling said pendulum arm to said chassis and/or to said front wheel. As compared to a ball joint coupling, the cardan coupling has the advantage that it prevents the coupling arm from rotating around its longitudinal axis so that respective momentums can be absorbed, particularly during cornering.

During low-speed movement and during standstill, tiltability of the vehicle results in a certain instability. Therefore, according to a particularly preferred embodiment of the invention, said suspension assembly is adjustable with view to a force acting against said movement of said front wheels and thereby against said tilting of said chassis.

Thereby, the invention provides for a possibility to adapt the tiltability of the vehicle to the given situation. For example, the tiltability should be low or disabled during low-speed movement and standstill of the vehicle, whereas it should be high particularly during high-speed movement on curved roads.

In view of the above, what is furthermore preferred is a means for automatically adjusting said suspension assembly, in response to the circumstances. Such an automatic adjusting can be adapted to respond to certain parameters, particularly to the current speed.

Alternatively or in addition, what can be provided for is a means for manually adjusting said suspension assembly. In other words, with this embodiment, the driver has the possibility to influence the tiltability of the vehicle intentionally.

According to a further preferred embodiment, said suspension comprises a pivotable balance beam being coupled to one of said front wheels on either side. This embodiment is preferred, because it is quite simple to be realized.

Furthermore, what is preferred is that said suspension assembly comprises an adjusting element being pressed against a moving element with adjustable pressing force. Once more, this embodiment appears to be a very simple solution.

Particularly with view to an automatic adjusting of the suspension assembly, what is preferred is to provide for a motor for adjusting said pressing force.

The vehicle according to the invention may have a single rear wheel. In other words, the invention is applicable to a tiltable 3-wheel-vehicle.

However, the invention is also applicable to a vehicle having a pair of rear wheels, i.e. a tiltable 4-wheel-vehicle.

All the above features of the invention described in connection with the front wheels may also apply to the rear wheels.

The present invention also relates to a vehicle that has, additionally or alternatively to the above features, 2 front wheels with variable track widths.

If the track width is adjusted to be narrow, and the tilting is not restricted, the vehicles behaves more or less like a vehicle having only a single front wheel, e.g. a bicycle or a motorcycle. If the tilting is restricted, some stability against falling will be achieved. With the track width of the front wheels being adjusted to be wide, and the tilting not being restricted, the vehicle still behaves like a motorcycle. If the tilting is restricted in the wide-track configuration, even greater stability against falling is achieved. Therefore, it is not necessary that a driver puts his feet down onto the ground to stabilize the vehicle, resulting in the possibility to provide for better side impact protection, e.g. by encapsulating the occupants on the lateral sides.

It is also noted that such enclosures shall also provide beneficial weather protection as well as streamlining the vehicle to diminish aerodynamic "loss".

As regards prior art, reference is made to U.S. Pat. Nos. 3,306,390; 5,829,542; BE-A-1 009 973; WO 99/50128 (EP-B-1 066 191) and GB-A-2,365,828.

Preferably, according to the invention, said front wheels are coupled to a chassis by means of pendulum arms mounted to said chassis pivotable about axes traverse to the front wheels' axes of rotation. Thus, the variation of the track width is performed by moving said pendulum arms around said axis traverse to the front wheels' axis of rotation, i.e. like scissors. This is a quite simple construction.

Preferably, according to the invention, cardan joints are used for coupling said pendulum arms to said chassis. The reason is that cardan joints are adapted to absorb momentums around the longitudinal axis of the pendulum arms, what is important particularly during cornering of the vehicle.

According to one preferred embodiment of the invention, a pivoting axis of a pendulum arm is vertical, when the vehicle is standing on horizontal ground. With this embodiment, an adjustment of the track widths is unaffected by the weight of the vehicle.

According to an alternative embodiment, a pivoting axis of a pendulum arm is inclined with respect to a vertical direction, when the vehicle is standing on horizontal ground. What may be achieved thereby is that the vehicle is lifted by narrowing the track widths, so that the weight of the vehicle assists a widening of the track widths. Furthermore, lifting the vehicle improves ground clearance—this is particularly useful for a tilting vehicle when at large tilting angles. Conversely, lowering the vehicle for slow speed manoeuvres and parking lowers the center of gravity, which improves the stability against falling.

According to a particularly preferred embodiment of the invention, the pivoting axes of said pendulum arms are—in the forward direction of the vehicle—within the area defined by the outer and inner planes defined by the outer and inner sides of the wheel transverse to the wheel's rotation axis, in the case of the smallest track widths. With this embodiment of the invention it is ensured that the braking forces acting on the wheels are led directly into the chassis (via the pendulum arms) in the case of the smallest track width, and that the braking forces are not acting to enlarge the track. Thus, the high braking forces occurring in the narrow track—high speed—situation are negotiated in a beneficial way.

All the above features described in connection with the front wheels are applicable to vehicles with a single rear wheel. However, the present invention is not limited to those 3-wheeled vehicles. Rather, the present invention also refers to a vehicle comprising 2 rear wheels with variable track widths.

Likewise, all the other features described above with reference to the front wheels are applicable to the rear wheels as well, according to the invention.

BRIEF DESCRIPTION OF THE DRAWINGS

In the following the invention is described referring to preferred embodiments thereof shown in the figures. In detail.

DETAILED DESCRIPTION OF THE INVENTION

Figure 1:
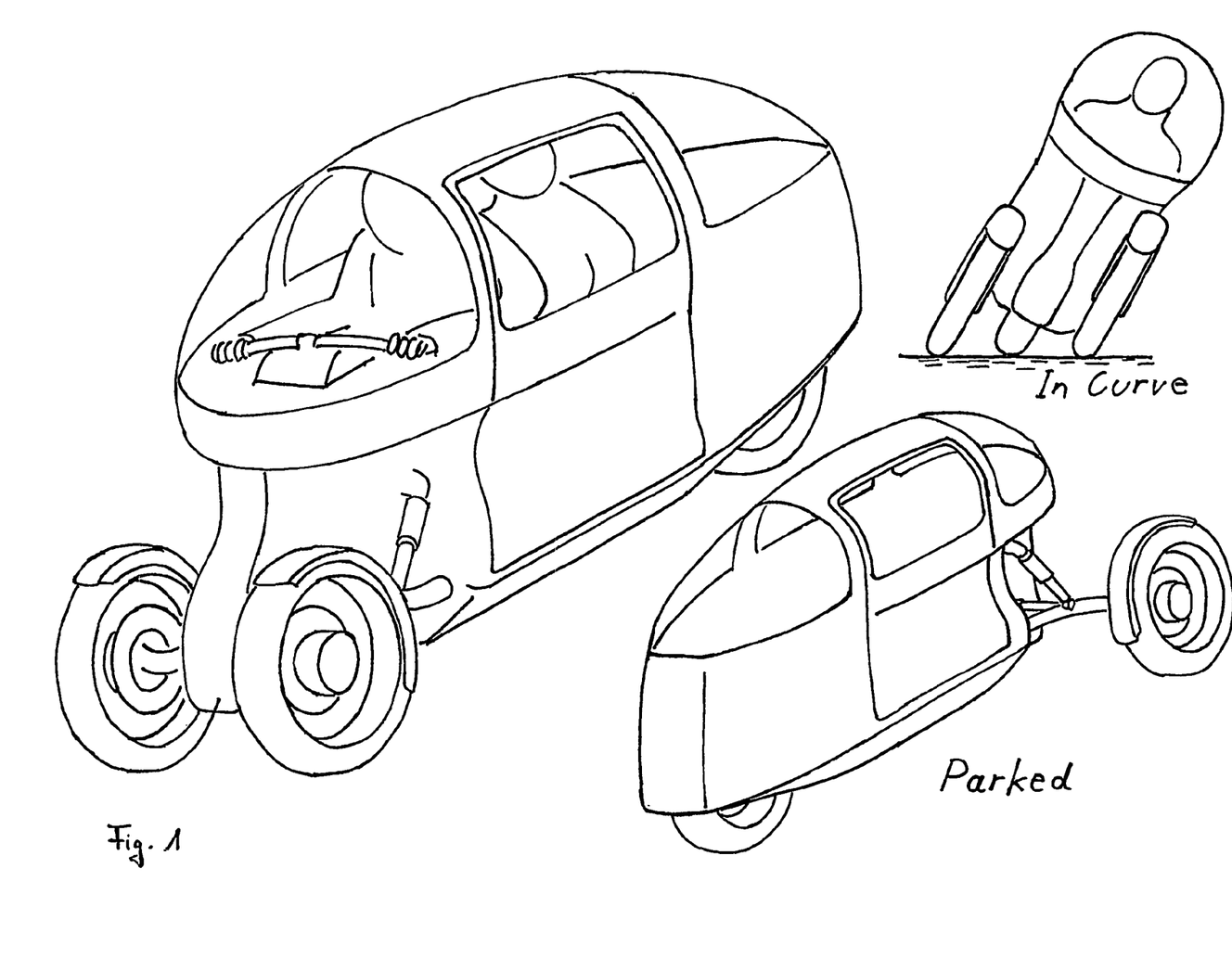
FIG. 1 shows diagrammatic overall views of a preferred 3-wheeled embodiment of the vehicle according to the invention, FIG. 2 diagrammatically shows (a) a preferred embodiment of the front wheel suspension assembly, and (b) an embodiment for a non-steering wheel suspension assembly.

FIG. 1 shows an encapsulated vehicle seating two persons in a row. This preferred embodiment of the invention comprises 2 variable track-steered front wheels and a single driven rear wheel. The vehicle is tiltable as shown in FIG. 1, upper right part. The vehicle takes this narrow track status as soon as the speed reaches a certain value, for example 10 kilometres per hour. In case that the speed is lower than 10 kilometres per hour, particularly when the vehicle is parked, the track width of the front wheels is enlarged, as shown in the lower right part of FIG. 1.

Figure 2:
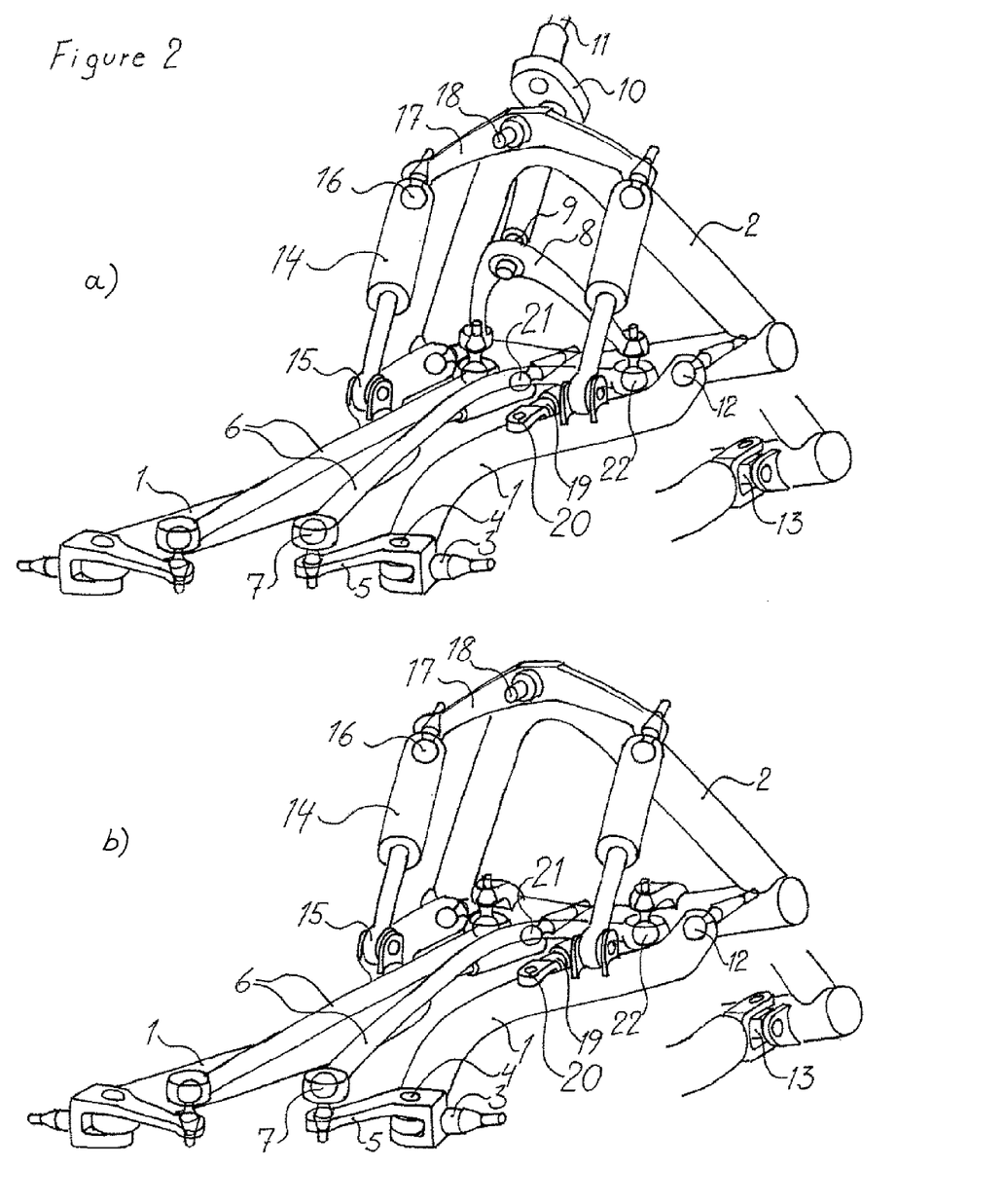

Upper view (a) of FIG. 2 shows details of the front wheel suspension assembly of the vehicle shown in FIG 1, as an isometric view. The assembly comprises pendulum arms 1 attached to a sub-frame (assembly cradle) 2. The front wheels (not shown) are revolving around axles 3 being integral with carriers 5. Carriers 5 are steered around king pins 4 when the steering arm extension of carriers 5 is actuated.

Said steering arms are linked to steering rods 6 through a ball joint 7. The mechanism is steered through swivel arms 8 which are fixed to a rotating shaft 9. Rotating shaft 9 is attached to a steering gear box 10 which alters the rotating direction of a steering shaft 11 onto which an ordinary motorcycle type handlebar is fixed (not shown).

Pendulum arms 1 are attached to sub-frame 2 and thereby to a chassis (not shown) through a ball joint 12 and is thus able to swivel in all axis directions. As shown in the lower right part of FIG. 2, ball joint 12 might be replaced by a cardan joint 13. This gives the added benefit of providing vertical and lateral swivelling freedom, but arresting pendulum arms 1 in rotation around the longitudinal axis, in order to absorb forces and momentums occurring during cornering of the vehicle.

Suspension spring/damper units 14 are attached to pendulum arms 1 through spherical joints 15.

Suspension spring/damper units 14 are furthermore connected to a balance beam 17 through ball joints 16. Balance beam 17 revolves around a pivot shaft 18 fixed to sub-frame 2 and thereby to the chassis (not shown).

Extendable link arms 19 support pendulum arms 1 through pivoting joints 20, and are supported by sub-frame 2 at the rear through ball joints 21. Said extendable link arms 19 are hydraulically controlled cylinders. Alternatively, they might be realized in the form of electrically actuated threaded spindles or wormwheels and threaded rods. It is understood that the invention covers other alternative solutions as well.

FIG. 2 shows the front wheel suspension assembly in the narrow track position. For adjusting the track widths, extendable link arms 19 are actuated to extend, resulting in that pendulum arms 1 swivel around joints 12 or 13, respectively. Thereby, the track width is enlarged.

The overall geometry may be arranged such that said swivelling does not occur around a vertical axis, but around an axis that is inclined, so that the swivelling plane of the wheels (not shown) is not a horizontal plane, but an inclined plane, resulting in that the chassis (not shown) is lifted when adjusting the front wheel suspension assembly to the narrow track status, and is lowered when adjusting it to the wide track status. Thereby, the weight of the chassis helps to switch into the wide track status. Furthermore, lifting the vehicle improves ground clearance—this is particularly useful for a tilting vehicle when at large tilting angles. Conversely, lowering the vehicle for slow speed manoeuvres and parking lowers the center of gravity, which improves the stability against falling.

Reference numeral 22 refers to ball joints coupling steering rods 6 to swivel arms 8 and, thereby, (indirectly) to the chassis. When the front wheels are oriented in the forward direction, said joint 22 lies approximately in a horizontal axis through joint 12 or 13, respectively. Thereby, the orientation of the front wheels is independent of an up and down movement of the front wheels, particularly during tilting, so that no "bump steer" occurs. What is to be noted in this respect is that joint 22 is positioned "approximately" in said horizontal axis through joint 12 or 13, respectively, meaning that the present invention covers deviations resulting from tolerances and imperfections and covers also an optimum positioning according to "Reimpell" mentioned above.

Lower view (*b*) of FIG. 2 shows details of a wheel suspension assembly similar to the upper view of FIG. 2, but without the steering components 8 through 11 so as to be adapted for installation on a pair of non-steering (e.g., rear) wheels of a vehicle.

Figure 3:
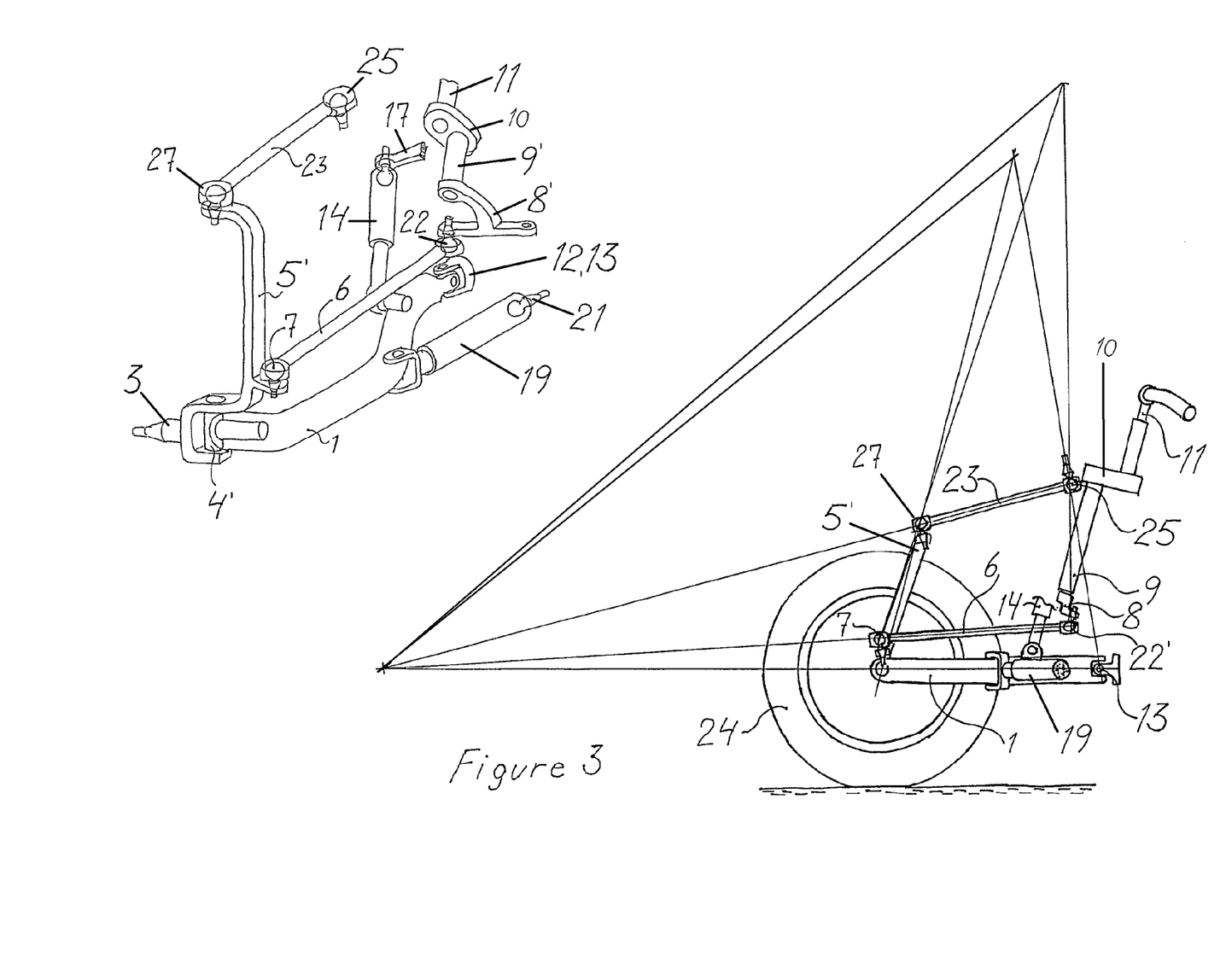
FIG. 3 shows diagrammatic side views of another embodiment of the front wheel suspension assembly.

FIG. 2 relates to an embodiment with only a single pendulum arm 1 for each front wheel. Contrary thereto, FIG. 3 refers to an embodiment comprising 2 pendulum arms 1 and 23 for a front wheel 24. In this case, joint 22' is positioned adjacent to a plane defined by horizontal lines through joint 13 on the one hand and a ball joint 25 on the other hand, said joint 25 (indirectly) coupling second pendulum arm 23 to the chassis (not shown). Pendulum arm 1 is linked to carrier 5' by a cardan joint 4'. Carrier 5' is linked to pendulum arm 23 by a ball joint 27. The position of joint 22' is defined as taught by "Reimpell", i.e. on an axis defined through employing the poles in the suspension mechanism trapezoid.

Figure 4:
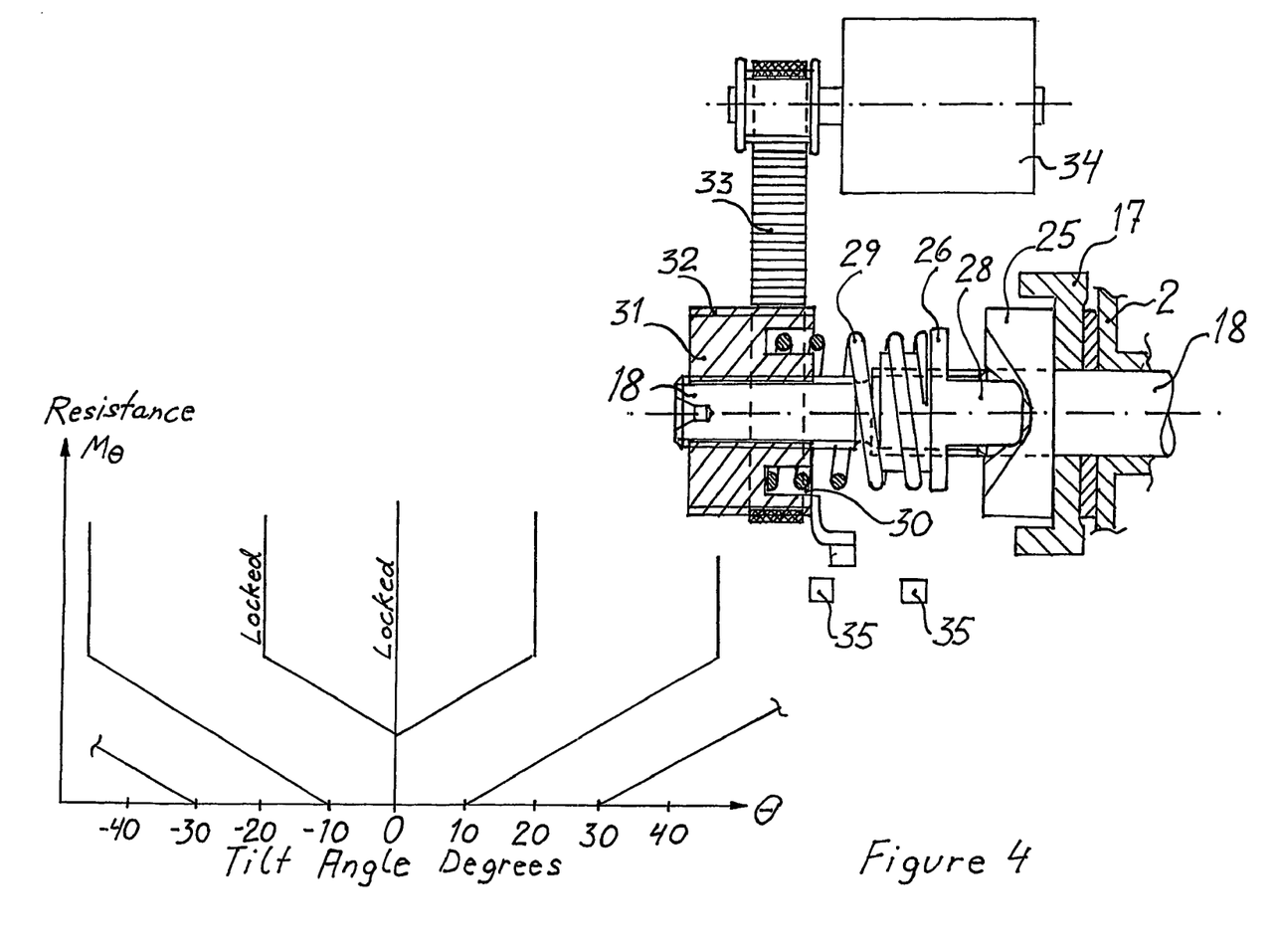
FIG. 4 shows a preferred embodiment of a device for adjusting a force acting against a tilting movement of front wheels.

FIG. 4 shows details of a force adjusting mechanism preferred in connection with the combination of pivot shaft 18 and balance beam 17. Said mechanism is as follows:

Shaft 18 is fixed to sub-frame 2. A face-cam segment 25 is fixed to balance beam 17, which balance beam 17 pivots around shaft 18. An internally splined ring element 26 is locked rotationally to a splined section of a shaft 18, but is in itself free to move axially along shaft 18. Ring element 26 comprises protruding segments 28 abutting face-cam segment 25.

A spring 29 controls ring element 26 axially—and sits in a groove 30 in a ring element 31. Ring element 31 is threaded onto a threaded portion of shaft 18 and has circumferential teeth 32 engaged by a toothed belt 33, which belt is driven by an electric motor 34. Motor 34 is preferably of the "stepper" type.

One or more position indicators 35 communicate some of the positions of the mechanism to a controlling system (not shown).

It is understood that by rotating ring element 31, resulting from the cams 25, 28, it is moved axially thus compressing or decompressing spring 29. It is also clear that when ring element 31 is hitting ring element 26, ring element 26 is locked axially. Thereby the resilient force of spring 29 (indirectly) acts against tilting movements. Furthermore, it assists a returning of the vehicle into an upright position, thereby somewhat stabilizing the vehicle, even in case that balance beam 17 is not locked.

By varying the geometry of face cam 25, protruding segments 28 and the characteristics of spring 29 as well as other relevant items, a variety of functional characteristics may be employed at will. These may then range from full rotational freedom to full lock up of the mechanism. It is also clear that various pre-compressions of spring 29 result in different progressive resistance characteristics.

The resistance of the mechanism against turning of balance beam 17 is described in the diagram of FIG. 4 as linear functions. It is, however, understood that various non-linear characteristics may easily be provided through this mechanism.

When the resistance against turning of balance beam 17 is low, the vehicle may be tilted very easily, because pendulum arms 1, 1 are coupled to one another through rotatable balance beam 17. If, however, the resistance against rotating of balance beam 17 is high (locked), pendulum arms 1, 1 are no more coupled to one another, so that the vehicle is prevented from tilting.

Advantageously, tilting of the vehicle is enabled when the vehicle is moving with a minimum speed of, e.g. 10 kilometres per hour, and tilting is disabled if the speed of the vehicle is lower than said 10 kilometres per hour or when the vehicle is in a parked position. This may be in compliance with the above-mentioned adjustment of the track widths. Thus, the adjustment of the track widths and the adjustment of the ability of tilting can be made dependent on one another or both dependent on the vehicle's speed. Alternatively, both adjustments may be made manually.

It is understood that the above-mentioned mechanism including a balance beam may be replaced by other suitable mechanisms, such as hydraulically driven systems including piston-cylinder-assemblies, which can be coupled or separated through a valve in a connection line between said 2 cylinders.

Figure 5:
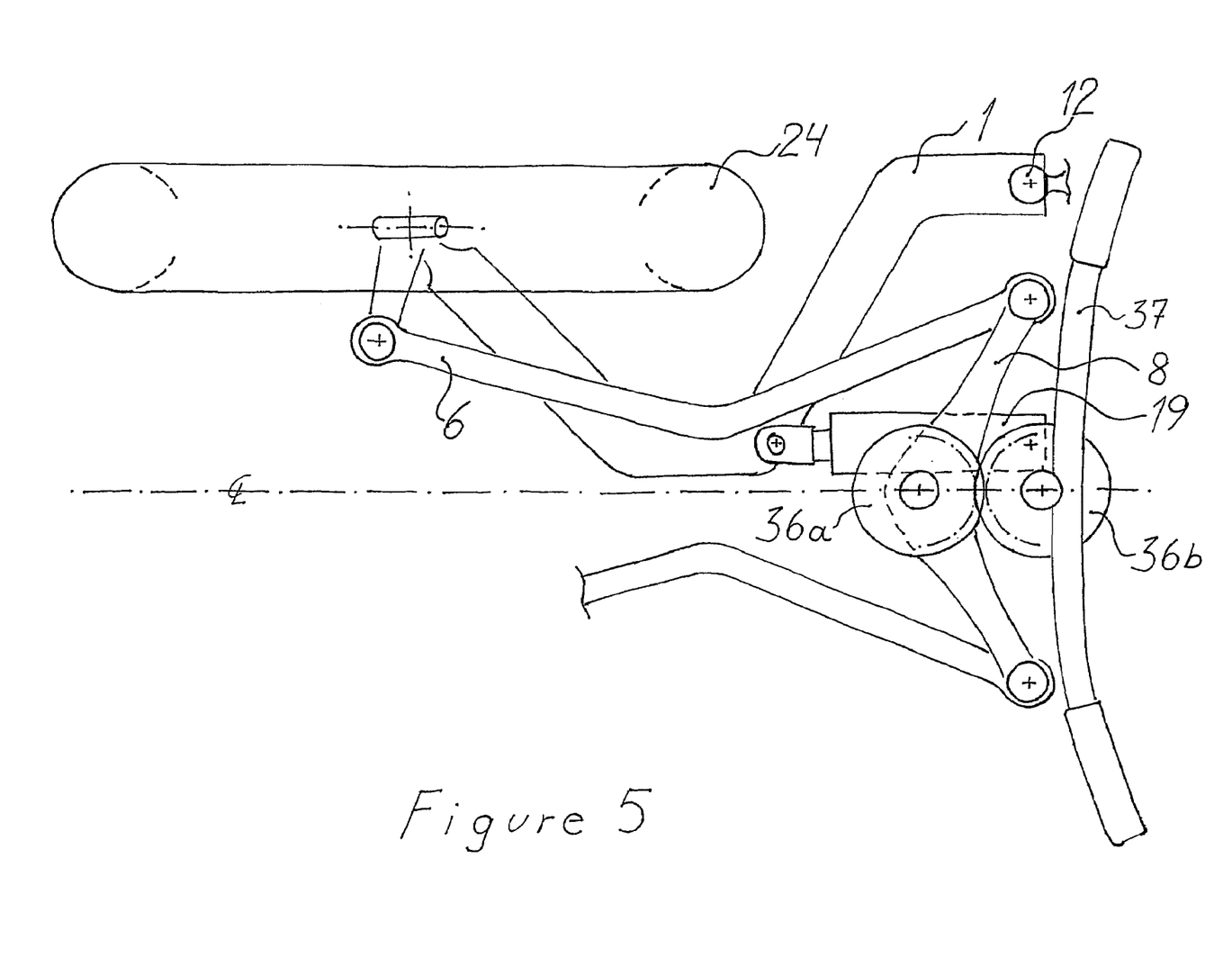
FIG. 5 shows a diagrammatic plan view of the front wheel assembly according to FIG. 2 and FIG. 6 diagrammatically shows the behaviour of the front wheel suspension assembly in case of an accident.

FIG. 5 shows a plan view of the front wheel suspension assembly according to FIG. 1. What is to be taken from FIG. 5 is particularly that in the narrow track position of the assembly joint 12 for coupling pendulum arm 1 to the chassis (not shown) is positioned within the area defined by the outer and inner planes defined by the outer and inner sides of wheel 24 transverse to the wheel's rotation axis. Thereby, braking forces are optimally absorbed by the chassis, what is most important when the vehicle is moving at high speed. Furthermore, the braking forces are not acting to enlarge the track. Thus, the high braking forces occurring in the narrow track—high speed—situation are negotiated in a beneficial way.

In other respects, FIG. 5 shows details of the steering mechanism. To this end, what is to be taken from FIG. 5 is that swivel arm 8 is connected to a gear wheel 36*a*, which is in mesh with a gear wheel 36. Gear wheel 36*b* is turned by a steering handlebar 37.

It is understood that the steering mechanism in FIG. 5 is only an example, but not limiting the scope of the invention. Rather, the invention is applicable to other suitable steering mechanisms.

Figure 6:
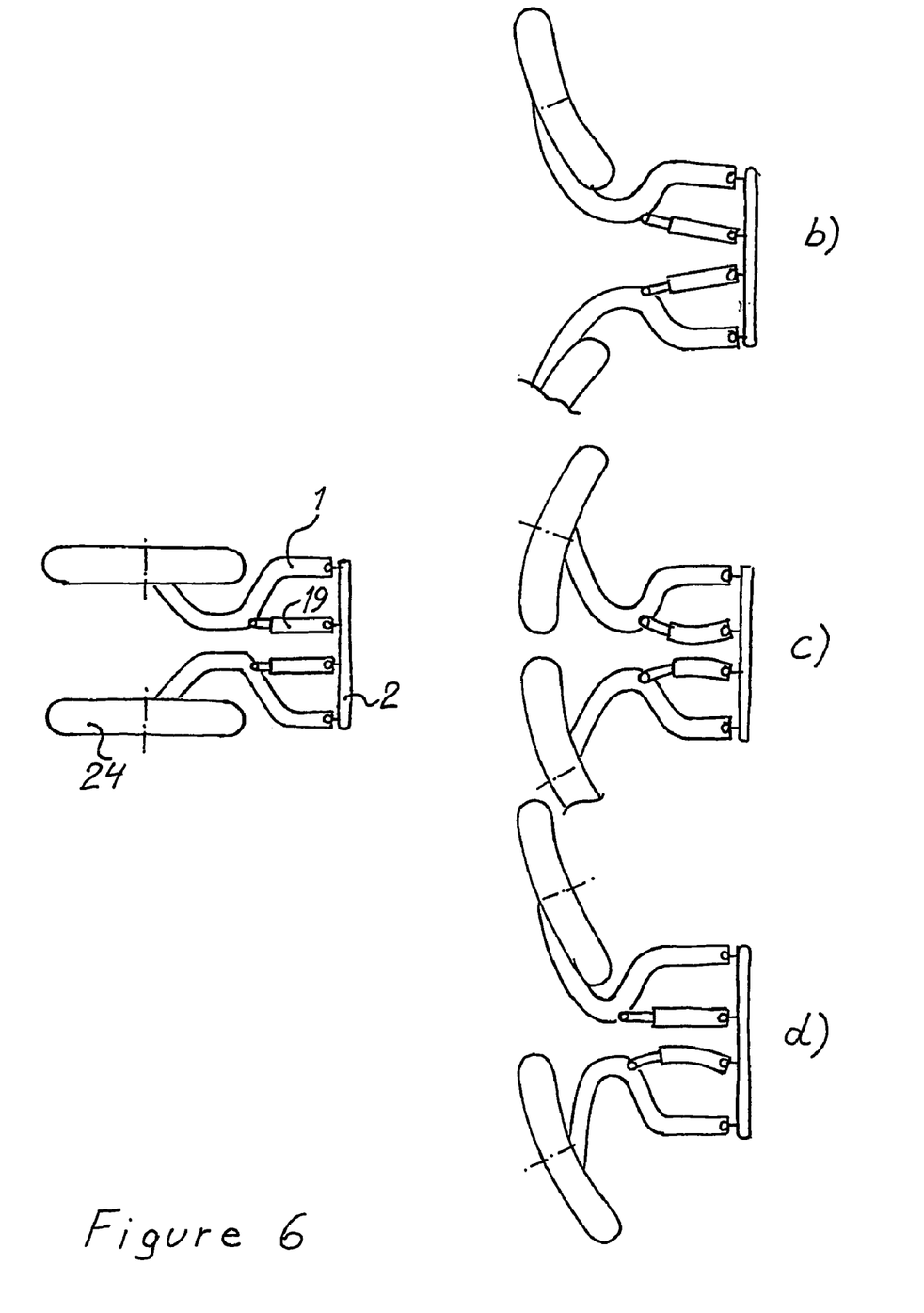

FIG. 6 shows 4 figures, all relating to a diagrammatic plan view of the front wheel suspension assembly of FIG. 1.

During a frontal impact, the wheels themselves can be expected to be deformed—being "ovalized"—thus increasing the impact area beneficially whilst absorbing crash impact energy. One can, however, also expect different modes of deformation following the deformation of the wheels, where the wheels and the pendulum arms are being forced either in- or outwards. FIGS. 6*b*, *c* and *d* show that these modes of deformation all increase the impact area of the vehicle. Thus, by providing 2 front wheels in a tiltable vehicle, the crash compatibility with other vehicles is improved together with absorbing crash impact energy through deformation of the elements.

The features mentioned and shown in the above description, in the claims and in the drawings may both, separately and in combination with one another, be essential for the invention.

While the invention has been described in terms of a preferred embodiment, it is apparent that other forms could be adopted by one skilled in the art. Therefore, the scope of the invention is to be limited only by the following claims.

The invention claimed is:

1. Vehicle comprising a chassis, front wheels each having an axis of rotation, and a suspension assembly for connecting said front wheels to said chassis, said front wheels having variable track widths, said suspension assembly being adapted to allow said front wheels to move transverse to their axes of rotation, but in opposite directions to tilt said chassis, wherein said suspension assembly comprises a wheel orientation defining rod coupled to at least a first of said front wheels; and means for pivotably coupling said wheel orientation defining rod to said chassis, said coupling means ensuring that a wheel orientation of said first front wheel defined by said wheel orientation defining rod is essentially independent of movement of said first front wheel transverse to the axis of rotation thereof.

2. Vehicle according to claim 1, wherein said wheel orientation defining rod is a steering rod.

3. Vehicle according to claim 1, wherein said suspension assembly further comprises a first pendulum arm coupling said first front wheel to said chassis.

4. Vehicle according to claim 3, wherein said first pendulum arm is coupled to said chassis at a joint and said coupling means is positioned approximately on a tilting pivot point of said first pendulum arm through said joint.

5. Vehicle according to claim 3, wherein said suspension assembly comprises a second pendulum arm coupling said first front wheel to said chassis, and said coupling means is positioned approximately on an axis defined by poles of a suspension mechanism rectangle or trapezoid defined by said suspension assembly.

6. Vehicle according to claim 3, further comprising a cardan joint for coupling said first pendulum arm to at least one of said chassis and said first front wheel.

7. Vehicle according to claim 3, further comprising means for coupling said first pendulum arm to said chassis so that said first pendulum arm swivels about said coupling means.

8. Vehicle according to claim 3, further comprising a cardan joint coupling said first pendulum arm to said chassis.

9. Vehicle according to claim 1, wherein said suspension assembly comprises means for adjusting a force acting against said movement of said front wheels and thereby against said tilting of said chassis.

10. Vehicle according to claim 9, further comprising means for automatically adjusting said suspension assembly in response to a forward speed of the vehicle.

11. Vehicle according to claim 9, further comprising means for manually adjusting said suspension assembly.

12. Vehicle according to claim 1, wherein said suspension assembly further comprises a pivotable balance beam coupled to said front wheels.

13. Vehicle according to claim 12, wherein said suspension assembly further comprises an adjusting element pressed against a moving element of said pivotable balance beam with adjustable pressing force.

14. Vehicle according to claim 13, further comprising a motor for adjusting said pressing force.

15. Vehicle according to claim 1, further comprising rear wheels and a second suspension assembly for connecting said rear wheels to said chassis, said second suspension assembly being adapted to allow said rear wheels to move transverse to their axes of rotation, but in opposite directions, in order to tilt said chassis, wherein said second suspension assembly comprises a second wheel orientation defining rod coupled to at least a first of said rear wheels; and second means for pivotably coupling said second wheel orientation defining rod to said chassis, said second coupling means ensuring that a wheel orientation of said first rear wheel defined by said second wheel orientation defining rod is essentially independent of movement of said first rear wheel transverse to the axis of rotation thereof.

16. Vehicle according to claim 15, wherein said second wheel orientation defining rod is a steering rod.

17. Vehicle according to claim 15 wherein said second suspension assembly comprises a first pendulum arm for coupling said first rear wheel to said chassis.

18. Vehicle according to claim 17, wherein said first pendulum arm is coupled to said chassis at a joint and said second coupling means of said second wheel orientation defining rod is positioned approximately on a tilting pivot point of said first pendulum arm through said joint.

19. Vehicle according to claim 17, wherein said second suspension assembly comprises a second pendulum arm coupling said first rear wheel to said chassis, and said second coupling means is positioned approximately on an axis defined by poles of a suspension mechanism rectangle or trapezoid defined by said second suspension assembly.

20. Vehicle according to claim 17, further comprising a cardan joint for coupling said first pendulum arm to at least one of said chassis and said first rear wheel.

21. Vehicle according to claim 15, wherein said second suspension assembly comprises means for adjusting a force acting against said movement of said rear wheels and thereby against said tilting of said chassis.

22. Vehicle according to claim 21, further comprising means for automatically adjusting said second suspension assembly in response to a forward speed of the vehicle.

23. Vehicle according to claim 21 further comprising means for manually adjusting said suspension assembly.

24. Vehicle according to claim 15, wherein said second suspension assembly further comprises a pivotable balance beam coupled to said rear wheels.

25. Vehicle according to claim 24, wherein said second suspension assembly comprises an adjusting element pressed against a moving element of said pivotable balance beam with adjustable pressing force.

26. Vehicle according to claim 25, further comprising a motor for adjusting said pressing force.

27. Vehicle according to claim 1, wherein said front wheels are coupled to said chassis with pendulum arms mounted to said chassis so as to be pivotable about axes traverse to the axes of rotation of said front wheels.

28. Vehicle according to claim 27, wherein said pendulum arms are coupled to said chassis by cardan joints.

29. Vehicle according to claim 27 wherein each of said pendulum arms has a pivoting axis that is vertical when the vehicle is standing on horizontal ground.

30. Vehicle according to claim 27 wherein each of said pendulum arms has a pivoting axis that is inclined with respect to a vertical direction when the vehicle is standing on horizontal ground.

31. Vehicle according to claim 27 wherein, when said front wheels are at a minimum of said variable track widths, the pivoting axes of said pendulum arms are within an area defined by outer and inner planes defined by outer and inner sides of said front wheels and transverse to the axes of rotation of said front wheels.

32. Vehicle according to claim 1, further comprising rear wheels having variable track widths.

33. Vehicle according to claim 32, wherein each of said rear wheels has an axis of rotation and said rear wheels are coupled to said chassis with pendulum arms mounted to said chassis so as to be pivotable about axes traverse to the axes of rotation of said rear wheels.

34. Vehicle according to claim 33, wherein said pendulum arms are coupled to said chassis by cardan joints.

35. Vehicle according to claim 33 wherein each of said pendulum arms has a pivoting axis that is vertical when the vehicle is standing on horizontal ground.

36. Vehicle according to claim 33 wherein each of said pendulum arms has a pivoting axis that is inclined with respect to a vertical direction when the vehicle is standing on horizontal ground.

37. Vehicle according to claim 33, wherein, when said rear wheels are at a minimum of said variable track widths, the pivoting axes of said pendulum arms are within an area defined by outer and inner planes defined by outer and inner sides of said front wheels and transverse to the axes of rotation of said front wheels.

38. A vehicle comprising a chassis, a pair of wheels each having an axis of rotation, at least a third wheel having an axis of rotation, and a suspension assembly connecting said pair of wheels to said chassis, said suspension assembly comprising means for causing said pair of wheels to move toward and away from each other so as to have variable track widths and causing said pair of wheels to move transverse to their axes of rotation, but in opposite directions so as to tilt said chassis.

39. The vehicle according to claim 38, wherein said pair of wheels are two front wheels of the vehicle.

40. The vehicle according to claim 38, wherein said pair of wheels are two steering wheels of the vehicle.

41. The vehicle according to claim 38, wherein said suspension assembly further comprises a pair of pendulum arms coupling said pair of wheels to said chassis.

42. The vehicle according to claim 41, further comprising means for coupling said pair of pendulum arms to said chassis so that each of said pair of pendulum arms swivels about said coupling means.

43. The vehicle according to claim 41, further comprising cardan joint coupling said pair of pendulum arms to said chassis.

44. The vehicle according to claim 41, wherein said suspension assembly further comprises:
  a pair of wheel orientation defining rods coupled to said pair of wheels; and
  means for pivotably coupling said wheel orientation defining rod to said chassis, said coupling means ensuring that a wheel orientation of each of said pair of wheels defined by said wheel orientation defining rods is essentially independent of movement of each of said pair of wheels transverse to the axes of rotation thereof.

45. The vehicle according to claim 41, wherein said suspension assembly further comprises a second pair of pendulum arms coupling said pair of wheels to said chassis, and said coupling means is positioned approximately on an axis defined by poles of a suspension mechanism rectangle or trapezoid defined by said suspension assembly.

46. The vehicle according to claim 41, wherein said suspension assembly further comprises means for adjusting a force acting against said movement of said pair of wheels and thereby against said tilting of said chassis.

47. The vehicle according to claim 41, wherein each of said pair of pendulum arms has a pivoting axis that is vertical when the vehicle is standing on horizontal ground.

48. The vehicle according to claim 41, wherein each of said pair of pendulum arms has a pivoting axis that is inclined with respect to a vertical direction when the vehicle is standing on horizontal ground.

* * * * *